United States Patent
Stevens et al.

(10) Patent No.: US 6,899,464 B2
(45) Date of Patent: May 31, 2005

(54) OPTICAL CONNECTOR

(76) Inventors: Rick Stevens, 12711 Edinborough Way, Apple Valley, MN (US) 55124; Kevin Thorson, 1167 Westbury Knoll, Eagan, MN (US) 55123; Ryan Nelson, 113 35th Pl.West, Clear Lake, IA (US) 50428

( * ) Notice: Subject to any disclaimer, the term of this patent is extended or adjusted under 35 U.S.C. 154(b) by 93 days.

(21) Appl. No.: 10/281,813

(22) Filed: Oct. 28, 2002

(65) Prior Publication Data

US 2004/0081405 A1 Apr. 29, 2004

(51) Int. Cl.[7] ................................................ G02B 6/36
(52) U.S. Cl. ........................................................ 385/53
(58) Field of Search ............................. 385/14, 53, 58, 385/59, 62, 70–72, 77, 78, 81, 1

(56) References Cited

U.S. PATENT DOCUMENTS

| | | | | |
|---|---|---|---|---|
| 4,518,220 A | * | 5/1985 | Swanson ...................... | 385/77 |
| 6,085,003 A | * | 7/2000 | Knight ......................... | 385/59 |
| 6,168,317 B1 | * | 1/2001 | Shahid ......................... | 385/71 |
| 6,287,017 B1 | * | 9/2001 | Katsura et al. ............... | 385/59 |
| 6,309,112 B1 | * | 10/2001 | Lecomte ...................... | 385/59 |
| 6,340,247 B1 | * | 1/2002 | Sakurai et al. ................ | 385/78 |
| 6,416,233 B2 | * | 7/2002 | Shirakawa .................... | 385/60 |
| 6,435,728 B2 | * | 8/2002 | Shimoji et al. ............... | 385/56 |
| 6,443,629 B1 | * | 9/2002 | Novacoski et al. ........... | 385/77 |
| 6,474,878 B1 | * | 11/2002 | Demangone .................. | 385/78 |
| 6,478,476 B1 | * | 11/2002 | Katsura et al. ............... | 385/78 |
| 6,530,696 B1 | * | 3/2003 | Ueda et al. ................... | 385/60 |
| 6,604,864 B2 | * | 8/2003 | Nguyen ........................ | 385/59 |

* cited by examiner

Primary Examiner—Dean A. Reichard
Assistant Examiner—Adolfo Nino

(57) ABSTRACT

An optical connector having alignment members for aligning with a connector on two mutually perpendicular axis with the optical connector including a displaceable block carrying optical fibers therein that is spatially positionable along a third axis to provide optical communication through the optical connector even though the optical connector may not have continuous optical fibers extending therethrough.

14 Claims, 3 Drawing Sheets

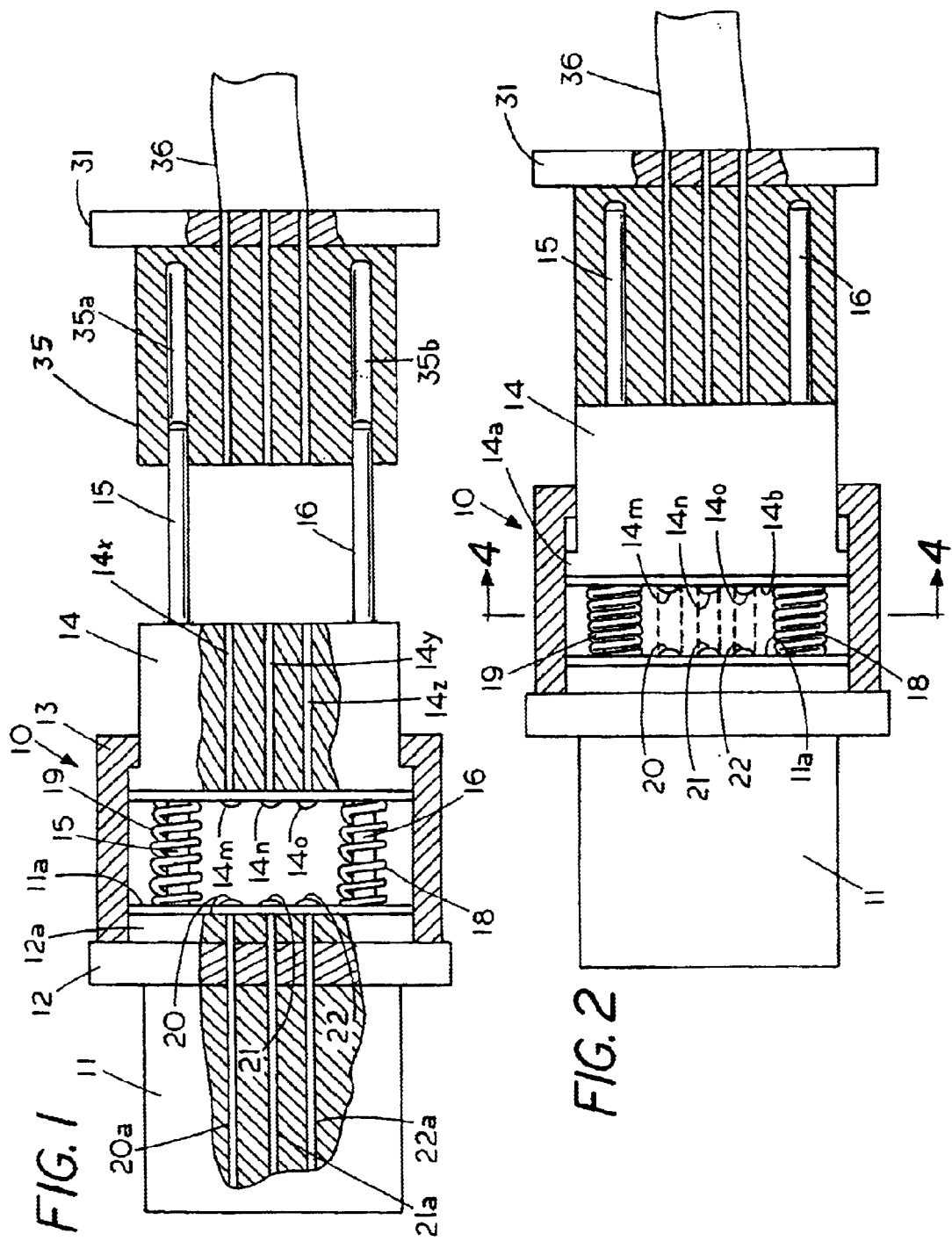

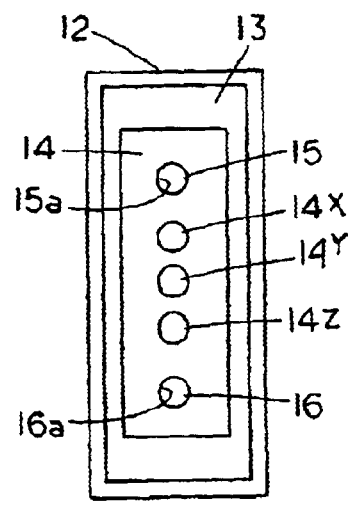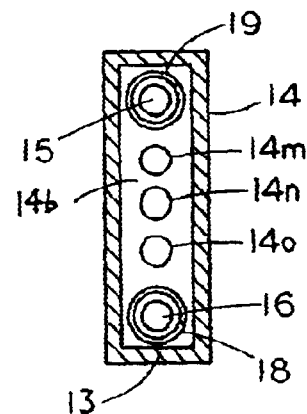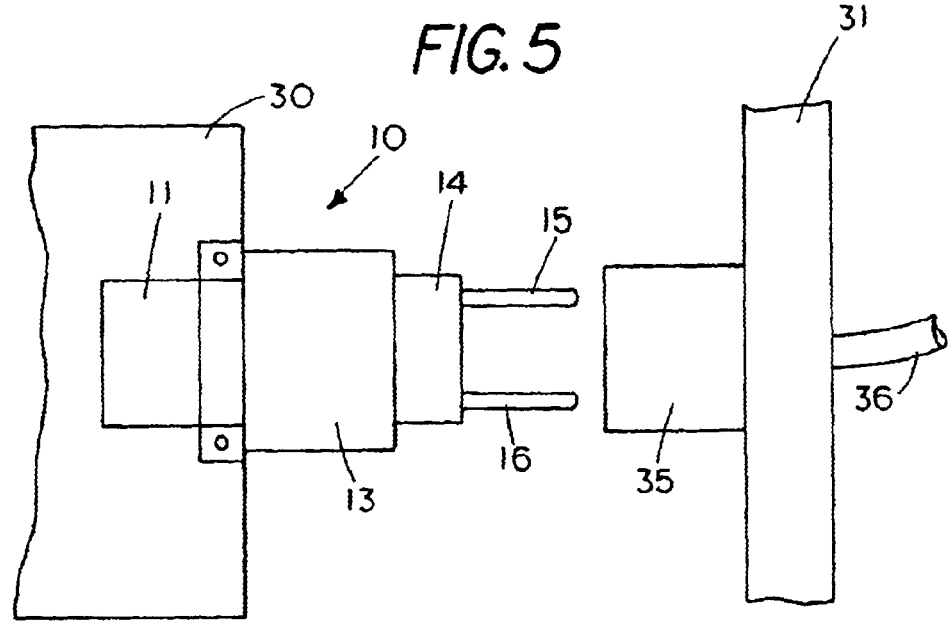

OPTICAL CONNECTOR

FIELD OF THE INVENTION

This invention relates in general to connectors and more specifically to optical connectors having a displaceable connector block that is axially displaceable to provide optical communication through one or more optical fibers carried by optical connector.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

The use of optical fibers for connecting circuit boards and the like to other circuit boards or to other devices such as a backplane is known in the art. Typically, one end of a flexible optical cable is secured to the circuit board and another end having a connector is secured to the external device such as a backplane connector. These type of flexible connectors are referred to in the industry as "pigtail connectors". While these type of flexible cable connectors provide an optical connection between the circuit board and the backplane they also require additional space in the compartment since the "pigtail connectors" have excess length, which forms a U-shaped loop in the flexible cable, that must be accommodated for by having extra space around the circuit board or the backplane connector.

While rigid optical connectors could be included on both the circuit board and the backplane connector such connectors would require extremely close tolerance to properly position the circuit board with respect to the backplane connector thus making such rigid connections unsuitable for most applications.

The present invention provides an optical connector that can be secured to a circuit board or the like with the optical connector including a displaceable connector block that allows one to connect the circuit board to the backplane connector without the need for precise three dimensional alignment between the circuit board and the backplane connector. As a result the present invention simplifies the manufacturing process while reducing the module area and the cost in providing optical connections between portions of a system such as a circuit board and a backplane. A further benefit is the optical connector of the present invention provides improved maintainability of the connection as well as improved reliability.

SUMMARY OF THE INVENTION

An optical connector having guide pins for aligning with a connector along two mutually perpendicular axis with the optical connector including a displaceable block carrying optical fibers therein that is spatially positionable along a third axis to provide optical communication across a gap in the optical connector.

BRIEF DESCRIPTION OF THE DRAWINGS

FIG. 1 is a cutaway view of the optical connector of the present invention in the unmated condition;

FIG. 2 is a cutaway view of the optical connector of FIG. 1 in a mated condition;

FIG. 3 is an end view of the optical connector of FIG. 1;

FIG. 4 is a sectional view taken along lines 4—4 of FIG. 2;

FIG. 5 is a plane view of a circuit board with an optical connector in an unmated condition with a receptacle on a backplane connector;

DESCRIPTION OF THE PREFERRED EMBODIMENT

Figure 6:
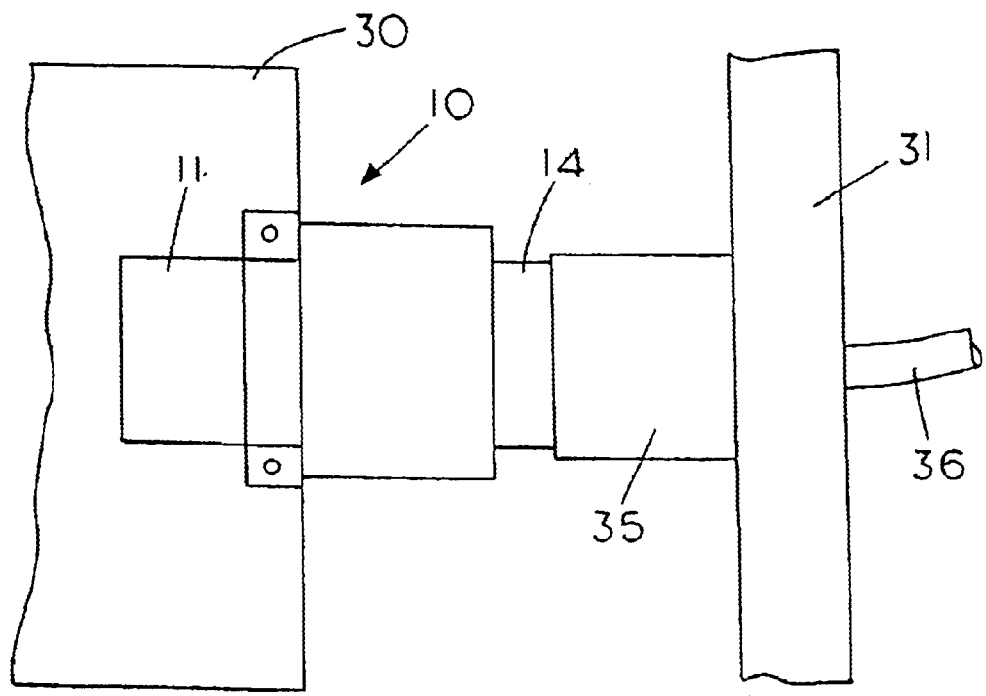
FIG. 6 is a plane view of a circuit board with an optical connector of FIG. 5 in a mated condition with a receptacle on a backplane connector.

FIG. 1 is a cutaway view of an optical connector 10 in an unmated condition. Optical connector 10 comprises a base 11 for securing to optical connections on a circuit board or the like, a flange 12 and a shroud 13. A first guide pin 15 extends from flange 12 through one side of a displaceable connector block 14 and a second guide pin 16 extends from flange 12 through the other side of displaceable connector block 14. Displaceable connector block 14 is slideable along guide pins 15 and 16. A first compression spring 19 located around guide pin 15 coacts with a second compression spring 18, which is located around guide pin 16 to provide a separation force to resiliently maintain block 14 in a spaced condition from a lens array in face 11a of base 11 as illustrated in FIG. 1. The lens array located in face 11a includes a set of optical fibers 20a, 21a and 22a with respective micro lenses 20, 21 and 22, that are directed toward a corresponding set of lenses 14m, 14n and 14o that respectively connect to optical fibers 14x, 14y and 14z in displaceable block 14. The micro lenses 20, 21 and 22 respectively convert the light from the fibers 20, 21a and 22a into collimated free space optical transmissions that are received respectively by lenses 14m 14n and 14o.

FIG. 2 is a cutaway view of the optical connector 10 as it would appear with displaceable block 14 in the mated condition. In a mated or optical transmission condition the displaceable block 14 slides toward face 11a with the flange 14a on block 14 slidingly engaging the interior of shroud 13. That is, block 14 is axially sliding along guide pins 15 and 16. The purpose of guide pins 15 and 16 are two fold. First, they maintain block 14 and the set of optical fibers 14x, 14y and 14z in block 14 in optical alignment with the optical lenses 20, 21, and 22 in face 11a. Second, the guide pins 15 and 16 comprise alignment members to provide two dimensional location of the connector 10 with respect to an attachment device. Consequently, only two-dimensional positioning is needed to mate the optical connector 14 with an external connector 35. Alignment in the third dimension is rendered less critical as block 14 can be displaced along guide pins 15 and 16 to accommodate alignment in the third mutual perpendicular axis. That is, the optical free transmissions from the connector face 11a are maintained in optical alignment with the corresponding lenses 14m, 14n and 14o fibers in block 14 allowing optical signals to traverse a gap between the face 11a and the face 14b of block 14.

FIG. 3 is an end view of the optical connector 10 showing the displaceable block 14 confined by shroud 13. Shroud 13 prevents interference with optical connections therethrough by preventing objects or external optical signals from contaminating the optical path in the gap between face 11a and face 14b. Located between the guide pins 15 and 16 are optical lenses 14m, 14n and 14o. Block 14 includes a cylindrical surface 15a that slidingly engage pin 15 and a cylindrical surface 16a that slidingly engages pin 16.

FIG. 4 is a sectional view taken along lines 4—4 of FIG. 2 showing the face 14b of block 14 with the optical fibers 20a, 21a and 22a each having a lens visible in face 14b. A reference to FIG. 2 shows dotted lines projecting from optical lenses 20, 21, and 22 to optical lenses 14m, 14n and 14o which are included to indicate that an optical signal from optical fiber 20a is in optical communication with optical fiber 14x across an open gap and that optical fiber 21a is in optical communication with optical fiber 14y across an open gap and the optical fiber 22a is in optical communication with optical fiber 14z across an open gap.

FIG. 5 is a plane view of a circuit board 30 with an optical connector 10 in an unmated condition with respect to a backplane receptacle 35 on a backplane 31.

FIG. 6 is a plane view of a circuit board 30 with an optical connector 10 of FIG. 5 in a mated condition with a backplane connector 35. Circuit board 30 connects externally through base 11 and optical connector 10. In operation it is desired to form an optical connection from circuit board 30 to backplane connector 35 which is mounted in back backplane 31. An optical cable 36 provides for optical connection to another portion of the system. In the embodiment shown in FIG. 5 it is noted that the optical connector 10 and circuit board 30 are in a spaced or unmated condition from backplane connector 35 while in FIG. 6 the optical connector 10 is in a mated condition or in optical connection with backplane connector 35.

A retention mechanism can also be a part of connector 35 or 10 such as locking levers, latches or other retentions members such as wedge locks. (not shown)

The mated condition of optical connector 10 is more fully illustrated in FIG. 2 which shows the shroud 13 partially cutaway to reveal the parallel optical paths between the block 14 and the receptacle 35. This optical connection is present regardless of the position of the block within optical connector 10.

Figure 7:
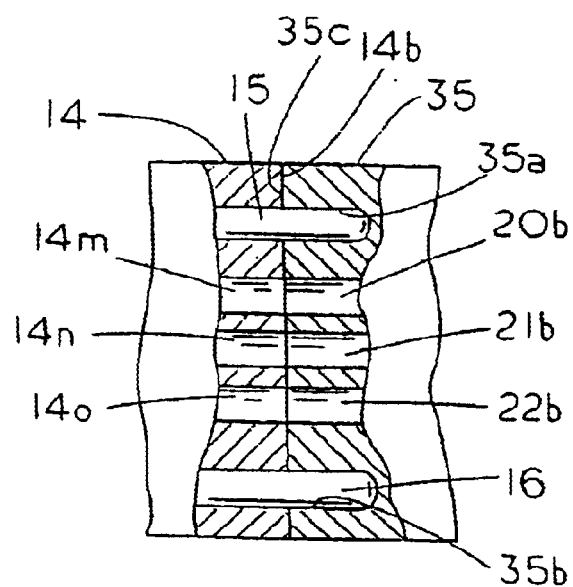
FIG. 7 is a cut away of the receptacle and the optical connector illustrating the face contact between the optical connector and the receptacle.

In order to reveal how the optical communication is formed between optical receptacle 35 and block 14, reference should be made to FIG. 7, which shows a partial sectional view of a portion of block 14 and receptacle 35. FIG. 7 shows that guide pin 15 extends into socket 35a and guide pin 16 extends into socket 35b in receptacle 35 to provide two-dimensional alignment of receptacle 35 with block 14. In the condition shown an external face on block 14 comprising a contact face 14b is in contact with an external face also comprising a contact face 35c of receptacle 35. In this condition optical fiber 14m is in optical communication with optical fiber 20b. Similarly, optical fiber 14n is in optical communication with optical fiber 21b and optical fiber 14o is in optical communication with optical fiber 22b. Thus in this embodiment the connector 35 and block 14 are in face-to-face contact to provide a continuous optical signal path through the connector to the receptacle 35. The use of springs 18 and 19 permit the connector 10 and receptacle to be brought into pressure contact with each other and to be maintained in pressure contact thereby ensuring that the face to face contact between contact face 14b and external face 35c is maintained during use of the optical connectors.

A further aspect of the invention is the method of making an optical connection between a first device and a second device comprising the steps of mounting a connector or receptacle 35 on the second device such as a backplane 31 and mounting an optical connector 10 on the first device, such as a circuit board 30 with the optical connector having two dimensional alignment members such as pins 15 and 16. By placing each of the alignment members 15 and 16 in a socket in the receptacle 35 one can provide two dimensional alignment of the optical connector 10 and the receptacle 35 and by continuing to bring the optical connector 10 toward the receptacle 35 until an external face 14b of the optical connector and an external face 35b of the receptacle are in contact and then by maintaining the optical connector and receptacle in position one can form an optical connection between the receptacle 35 and a displaceable block 14 in the optical connector 10.

We claim:

1. An optical connector comprising:
    a base;
    a pair of alignment members extending from said base;
    at least one optical fiber extending through said base;
    a displaceable connector block slidable along said alignment members, said displaceable connector block having an open face and an external face, said displaceable connector block having at least one optical fiber extending from said open face to said external face, said at least one optical fiber in said displaceable connector block providing optical communication across a gap in said optical connector located between the at least one optical fiber extending through said base and the open face of the displaceable connector block when said displaceable connector block is in a mated condition.

2. The optical connector of claim 1 wherein the displaceable connector block includes at least two optical fibers and the base includes at least two optical fibers.

3. The optical connector of claim 1 including a receptacle having at least one optical fiber wherein the receptacle includes sockets for mechanically engaging the alignment members.

4. The optical connector of claim 3 wherein the receptacle includes a contact face for forming contact engagement with the external face of the block.

5. The optical connector of claim 1 wherein the optical connector includes a spring for resilient maintaining the displaceable connector block in an extended condition when unmated and for maintaining the displaceable connector block in a contact condition with an external face on an receptacle when the optical connector is in a mated condition.

6. The optical connector of claim 1 wherein the optical connector includes a first compression spring extending around said first alignment member and a second compression spring extending around said second alignment member.

7. The optical connector of claim 1 wherein the optical connector includes a shroud encompassing a portion of the displaceable block to prevent contamination of optical signals therein.

8. The optical connector of claim 1 wherein the displaceable connector block is slidingly mounted on said alignment members.

9. The optical connector of claim 1 wherein the alignment members are located in a parallel condition with the at least one optical fiber in the displaceable block located parallel to the alignment members and each of said at least one optical fibers includes a lens for transmitting an optical signal across the gap in the optical connector.

10. An optically connected system comprising:

a circuit board;

an optical connector secured to said circuit board said optical connector having a base with a plurality of optical fibers each having an end face located in an open face of said base, said optical connector having a resiliently displaceable connector block having a plurality of optical fibers extending from an open face of said displaceable connector block to an external face of said displaceable block with said plurality of optical fibers of said base of said optical connector spaced from said plurality of optical fibers in said displaceable block to form a gap between said displaceable block and said base;

a backplane connector for attachment to said circuit board, said backplane connector having an external face for optically engaging said external face of said displaceable connector block so that when the backplane connector is brought into optical communication with the external face of the displaceable connector block the displaceable connector block displacing yields but maintains an optical connection within the optical connector.

11. The system of claim 10 wherein the optical connector includes two alignment members and a receptacle having two sockets for mechanically engaging the alignment members.

12. The system of claim 11 wherein the optical connector includes a set of springs to maintain a spring force on the displaceable connector block.

13. The system of claim 12 wherein the springs comprise compression springs positioned around said alignment members.

14. The system of claim 13 including a shroud surrounding the optical connector to prevent interference with optical connections thereon.

* * * * *